United States Patent
Barsness et al.

(10) Patent No.: US 7,127,449 B2
(45) Date of Patent: Oct. 24, 2006

(54) DATA QUERY SYSTEM LOAD OPTIMIZATION

(75) Inventors: Eric L. Barsness, Pine Island, MN (US); Randy W. Ruhlow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/645,740

(22) Filed: Aug. 21, 2003

(65) Prior Publication Data

US 2005/0044063 A1 Feb. 24, 2005

(51) Int. Cl.
G06F 17/30 (2006.01)
(52) U.S. Cl. .............................. 707/2; 707/3; 707/100; 707/101; 705/26
(58) Field of Classification Search .................... 707/2, 707/201, 3, 100, 101; 705/26
See application file for complete search history.

(56) References Cited

U.S. PATENT DOCUMENTS 5,471,629 A * 11/1995 Risch .......................... 707/201
6,212,514 B1   4/2001 Eberhard et al.
2003/0182197 A1* 9/2003 Beckman ..................... 705/26

* cited by examiner

Primary Examiner—Jeffrey Gaffin
Assistant Examiner—Farhan M. Syed
(74) Attorney, Agent, or Firm—Patterson & Sheridan

(57) ABSTRACT

A system, method and article of manufacture for query execution management in a data processing system and, more particularly, for optimizing execution of queries that are repeatedly executed against one or more databases in a data processing system. One embodiment provides a method for optimizing execution of a query that is repeatedly issued from an issuing entity against a database. The method comprises executing the query against the database to obtain an initial query result, returning the initial query result to the issuing entity, and managing re-execution of the query. Managing the re-execution comprises storing the initial query result in a temporary query result data structure, executing a trigger procedure for tracking database changes, when the trigger procedure detects a database change, updating the temporary query result data structure on the basis of the detected database change, and when the query is re-executed against the database, returning the temporary query result data structure to the issuing entity as query result.

38 Claims, 7 Drawing Sheets

DATA QUERY SYSTEM LOAD OPTIMIZATION

CROSS-RELATED APPLICATION

This application is related to the following commonly owned patent: U.S. Pat. No. 6,212,514 entitled "DATA BASE OPTIMIZATION METHOD FOR ESTIMATING QUERY AND TRIGGER PROCEDURE COSTS", which is hereby incorporated herein in its entirety.

BACKGROUND OF THE INVENTION

1. Field of the Invention

The present invention generally relates to query execution management in a data processing system and, more particularly, to optimizing execution of queries against one or more databases in a data processing system.

2. Description of the Related Art

Complex computing systems may be used to support a variety of applications. One common use is the maintenance of databases, from which information may be obtained. Databases are computerized information storage and retrieval systems. The most prevalent type of database is the relational database, a tabular database in which data is defined so that it can be reorganized and accessed in a number of different ways. Another type of database is a distributed database that can be dispersed or replicated among different points in a network.

Regardless of the particular architecture, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) in the case of a relational database. Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data in a database, and so forth.

Queries and, consequently, query workload can consume significant system resources, particularly processor resources. The system resources consumption of a query against one or more databases depends on the complexity of the query and the searched database(s). For instance, assume a large data warehouse that runs in a production environment for its intended use in the day-by-day business of a company. The production environment may support query requests submitted to the large data warehouse. The data warehouse can include large sets of data for data mining environments such as insurance claims, property listings and the medical industry. The large sets of the data can be organized, for instance, in a relational database schema in large distributed databases arranged in a distributed environment. In the distributed environment, a given query may be executed against multiple databases. Accordingly, executing queries against the large data warehouse may lead to searches that consume significant system resources. Furthermore, significant amounts of time can be required for completion of such queries. Some queries can literally take hours for data gathering, retrieving and sorting. Moreover, such queries can be executed repeatedly against the large data warehouse. For instance, assume a researcher who frequently performs an identical search for data in the data warehouse by repeatedly issuing the same query. The first execution of the query would result in an initial query result. The second and all subsequent executions will in all likelihood be an attempt to find new data in the data warehouse that matches the original query. The new data can be added to or removed from the data warehouse by update, delete or insert operations on the data in the data warehouse. Assume now that the query consumes significant system resources and that no new data is added to or removed from the data warehouse between different executions of the query. However, each time the query is re-issued, it will be executed against the large data warehouse and consume the significant system resources. Therefore, one difficulty when dealing with query requests against large data warehouses in distributed data environments is ensuring an acceptable turnaround. Another difficulty is ensuring successful completion of a query. This applies especially to queries that are long running and involve multiple databases in a distributed data environment as well as to queries that are repeatedly executed and consume significant system resources.

Accordingly, a number of techniques have been employed to deal with these difficulties. For instance, additional hardware may be allocated to ensure that queries are satisfied with adequate response times. Moreover, large database applications have query optimizers which construct search strategies. An optimizer is an application program which is intended to construct a near optimal search strategy for a given set of search parameters, according to known characteristics of the database, the system on which the search strategy will be executed, and/or optional user specified optimization goals. But not all strategies are equal and various factors may affect the choice of an optimum search strategy. However, in general such search strategies merely allow for an improved use of available hardware/software components to execute respective queries.

A major drawback of these approaches is that they generally lead to less than optimal utilization of computing resources. Moreover, they usually require extra computing resources that are not fully utilized, except for peak query workload periods. Furthermore, these approaches are not suitable to optimize execution of queries that are repeatedly issued against databases.

Therefore, there is a need for an effective query execution management in a data processing system for optimizing execution of queries that are repeatedly issued against one or more databases in the data processing system.

SUMMARY OF THE INVENTION

The present invention is generally directed to a method, system and article of manufacture for query execution management in a data processing system and, more particularly, for optimizing execution of queries that are repeatedly executed against one or more databases in a data processing system.

One embodiment provides a method for optimizing execution of a query that is repeatedly issued from an issuing entity against a database. The method comprises executing the query against the database to obtain an initial query result, returning the initial query result to the issuing entity, and managing re-execution of the query. Managing re-execution of the query comprises storing the initial query result in a temporary query result data structure, executing a trigger procedure for tracking database changes, when the trigger procedure detects a database change, updating the temporary query result data structure on the basis of the detected database change, and, when the query is re-executed against the database, returning the temporary query result data structure to the issuing entity as query result.

Another embodiment provides a method for optimizing system resource use for execution of a query that is repeatedly issued from an issuing entity against a database in a data processing system. The method comprises tracking changes to the database and, if a database change is detected, retrieving a temporary query result data structure storing a query result that was previously obtained in response to execution of the query, updating the temporary query result data structure on the basis of the detected database change, and, if the query is re-executed against the database, returning the temporary query result data structure as query result to the issuing entity.

Still another embodiment provides a computer readable medium containing a program which, when executed, performs a process for optimizing execution of a query that is repeatedly issued from an issuing entity against a database. The process comprises executing the query against the database to obtain an initial query result, returning the initial query result to the issuing entity, and managing re-execution of the query. Managing re-execution of the query comprises storing the initial query result in a temporary query result data structure, executing a trigger procedure for tracking database changes, when the trigger procedure detects a database change, updating the temporary query result data structure on the basis of the detected database change, and, when the query is re-executed against the database, returning the temporary query result data structure to the issuing entity as query result.

Still another embodiment provides a computer readable medium containing a program which, when executed, performs a process for optimizing system resource use for execution of a query that is repeatedly issued from an issuing entity against a database in a data processing system. The process comprises tracking changes to the database and, if a database change is detected, retrieving a temporary query result data structure storing a query result that was previously obtained in response to execution of the query, updating the temporary query result data structure on the basis of the detected database change, and, if the query is re-executed against the database, returning the temporary query result data structure as query result to the issuing entity.

Still another embodiment provides a data processing system comprising a database and a query optimizer residing in memory for optimizing execution of a query that is repeatedly issued from an issuing entity against the database. The query optimizer is configured for executing the query against the database to obtain an initial query result, returning the initial query result to the issuing entity, and managing re-execution of the query by storing the initial query result in a temporary query result data structure, executing a trigger procedure for tracking database changes, when the trigger procedure detects a database change, updating the temporary query result data structure on the basis of the detected database change, and, when the query is re-executed against the database, returning the temporary query result data structure to the issuing entity as query result.

Still another embodiment provides a data processing system comprising a database and a query optimizer residing in memory for optimizing system resource use for execution of a query that is repeatedly issued from an issuing entity against the database. The query optimizer is configured for tracking changes to the database; and, if a database change is detected, retrieving a temporary query result data structure storing a query result that was previously obtained in response to execution of the query, updating the temporary query result data structure on the basis of the detected database change, and, if the query is re-executed against the database, returning the temporary query result data structure as query result to the issuing entity.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
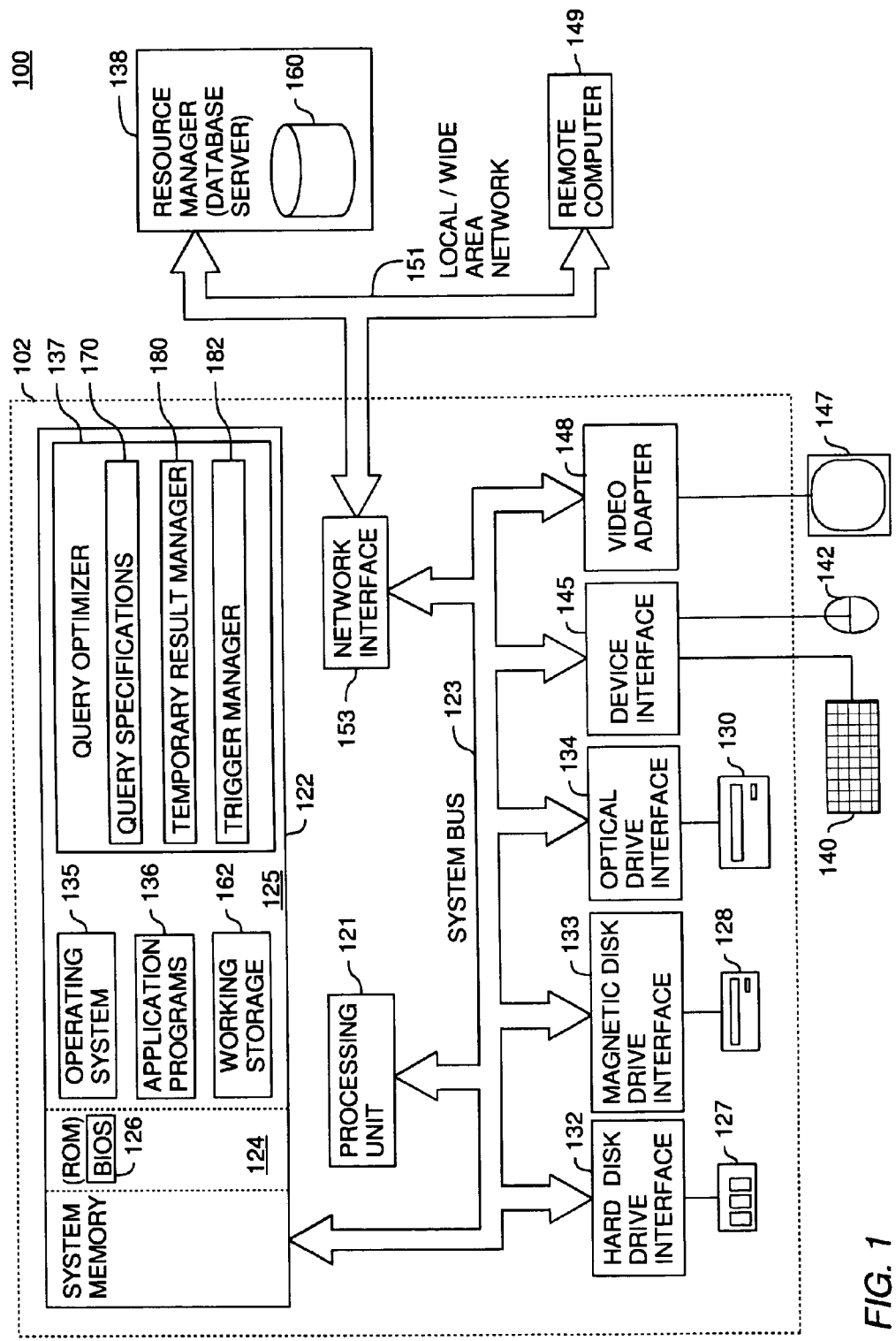
FIG. 1 is a computer system illustratively utilized in accordance with the invention.

The present invention is generally directed to a method and article of manufacture for query execution management in a data processing system and, more particularly, for optimizing execution of queries that are repeatedly executed against one or more databases in a data processing system. According to one aspect of the invention, the data processing system is a production environment, in which a data warehouse runs for its intended use in the day-by-day business of a company. The data warehouse includes one or more distributed data sources. Each data source may represent a separate database having large sets of data for data mining environments such as insurance claims, property listings and the medical industry.

In the production environment, queries are issued by an issuing entity, such as an application or user, against the database(s). When the production environment receives a query from an issuing entity, a verification takes place to determine whether the received query is re-executable. In the context of the invention, a query is "re-executable" if the issuing entity intends to execute the query two or more times against the database(s). A query can also be determined as "re-executable" if the query is executed more than once against the database(s). If the received query is re-executable, it is initially executed against the database(s) to obtain an initial query result. The initial query result is returned to the issuing entity. Subsequently, re-execution of the query is managed to optimize system resource use in the production environment.

According to one aspect of the invention, re-execution management involves storing the initial query result in a temporary query result data structure associated with the query. The temporary query result data structure is maintained in storage and updated when changes to the database(s) occur, which are relevant to the query. More specifically, in one embodiment changes to the database(s) are tracked. For instance, the changes are tracked by executing a trigger procedure on the database(s). A change may occur in response to an update, delete or insert operation on the database(s). If a database change is detected, the temporary query result data structure is retrieved from storage. On the basis of the detected database change, the temporary query result data structure is updated if the detected database change is relevant to the query.

Accordingly, the temporary query result data structure always contains an up-to-date query result with respect to the received query. When the issuing entity issues the query again, this up-to-date query result can immediately be returned to the issuing entity as the current query result. Thus, waiting time for the issuing entity may be reduced.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, processing environment 100 shown in FIG. 1 and described below. The program(s) of the program product defines functions of the embodiments (including the methods described below with reference to FIGS. 3 to 7) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein by any suitable nomenclature, such as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Some embodiments of the present invention are described in the context of queries. However, embodiments within the scope of the invention are applicable to any data processing system in which it is desirable to manage a repeated execution of requests for accessing data that is present in local or remote data sources. Furthermore, while some embodiments may refer to specific database schemas like relational databases and/or query languages like SQL, it should be understood that the present invention is not intended to be limited to such a specific database schema and/or query language. Instead, any known or unknown database schema and/or query language is contemplated.

FIG. 1 is a processing environment 100 generally comprising a computer or data processing system 102 communicating with a remote computer 149. Illustratively, the computer system 102 includes a processing unit 121, a system memory 122, and a system bus 123 that operatively couples various system components, including the system memory 122, to the processing unit 121. There may be only one or there may be more than one processing units 121, such that the processor of computer system 102 includes a single central processing unit (CPU), or a plurality of processing units, as in the case of a multiprocessor system.

The system bus 123 may be any of several types of bus structures including a memory bus or memory controller, a peripheral bus, and a local bus using any of a variety of bus architectures. The system memory 122 may also be referred to as simply the "memory", and includes read only memory (ROM) 124 and random access memory (RAM) 125. A basic input/output system (BIOS) 126 stored in ROM 124 contains the basic routines that help to transfer information between elements within the computer system 102, such as during start-up. A portion of the system memory 122 is set aside as working storage 162. Illustratively, the working storage 162 is shown as a part of the random access memory 125. However, the working storage 162 may be established in any memory space and in particular in high-speed memory devices, such as cache memory. In other embodiments, working storage includes storage on devices such as hard disks.

The computer system 102 further includes a plurality of storage access devices, which may be configured with working storage. Such devices include a hard disk drive 127, a magnetic disk drive 128, and an optical disk drive 130 (e.g., a CD-ROM or DVD drive). The hard disk drive 127, magnetic disk drive 128, and optical disk drive 130 are connected to the system bus 123 by a hard disk drive interface 132, a magnetic disk drive interface 133, and an optical disk drive interface 134, respectively. The drives and their associated computer-readable media provide nonvolatile storage of computer-readable instructions, data structures, program modules and other data for the computer system 102. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules and data structures may be stored on the media readable hard disk drive 127, magnetic disk drive 128, optical disk drive 130, ROM 124, or RAM 125. Illustrative programs include an operating system 135, one or more application programs 136 and a query optimizer 137 having query specifications 170, a temporary result manager 180 and a trigger manager 182. The query optimizer 137 manages execution of queries that are repeatedly executed against one or more databases, such as database 160. In one embodiment, the query optimizer 137 is configured for optimizing use of system resources required for re-execution of queries. The query optimizer 137 and its constituent functions are further described below with reference to FIG. 2.

A user may enter commands and information into the computer system 102 through input devices such as a keyboard 140 and a pointing device 142. These and other devices may be connected to the processing unit 121 through an interface 145 that is coupled to the system bus. Illustratively, the interface 145 is a serial port interface, but other interfaces, such as a parallel port or a universal serial bus (USB) are also contemplated. A monitor 147 or other type of display device is also connected to the system bus 123 via an interface, such as a video adapter 148. In addition to the monitor 147, the computer system 102 may include other peripheral devices such as speakers and printers.

The computer system 102 may operate in a networked environment using logical connections to one or more remote systems. These logical connections are achieved by a communication device coupled to or part of the computer system 102. The logical connections depicted in FIG. 1 are represented by a network connection 151 and may include a local-area network (LAN) and a wide-area network (WAN). Such networking environments are commonplace in office networks, enterprise-wide computer networks, intranets and the Internet, which are all types of networks. In one embodiment, the network connection 151 is wireless.

The computer system 102 is connected to the network 151 through a network interface or adapter 153, which is one type of communications device. When used in a WAN-networking environment, the computer system 102 may include a modem, or any other type of communications device for establishing communications over the wide area network, such as the Internet. In a networked environment, program modules depicted relative to the computer system 102, or portions thereof, may be stored in the remote memory storage device. It should be appreciated that the network connections shown are exemplary and other means of and communications devices for establishing a communications link between the computers may be used.

Illustratively, the network connection 151 communicates the computer system 102 with a backend resource manager 138 and a remote computer 149 (representing any type of machine, e.g., workstation or personal digital assistant (PDA)). In general, the resource manager 138 may be a relational database, a messaging system, or any type of middleware which provides data management services that can be accessed by an application program 136 or the query optimizer 137. In a particular embodiment the backend resource manager 138 is a database server. As such, the database 160 is shown associated with the backend resource manager 138. For simplicity only one database 160 is shown. However, the database server can include multiple databases. Furthermore, the database server can implement a data warehouse including multiple distributed databases.

Although shown separately from the computer system 102, in another embodiment the backend resource manager 138 is a part of the computer system 102. In a particular embodiment, the resource manager 138 is part of a relational database management system (RDBMS).

Figure 2:
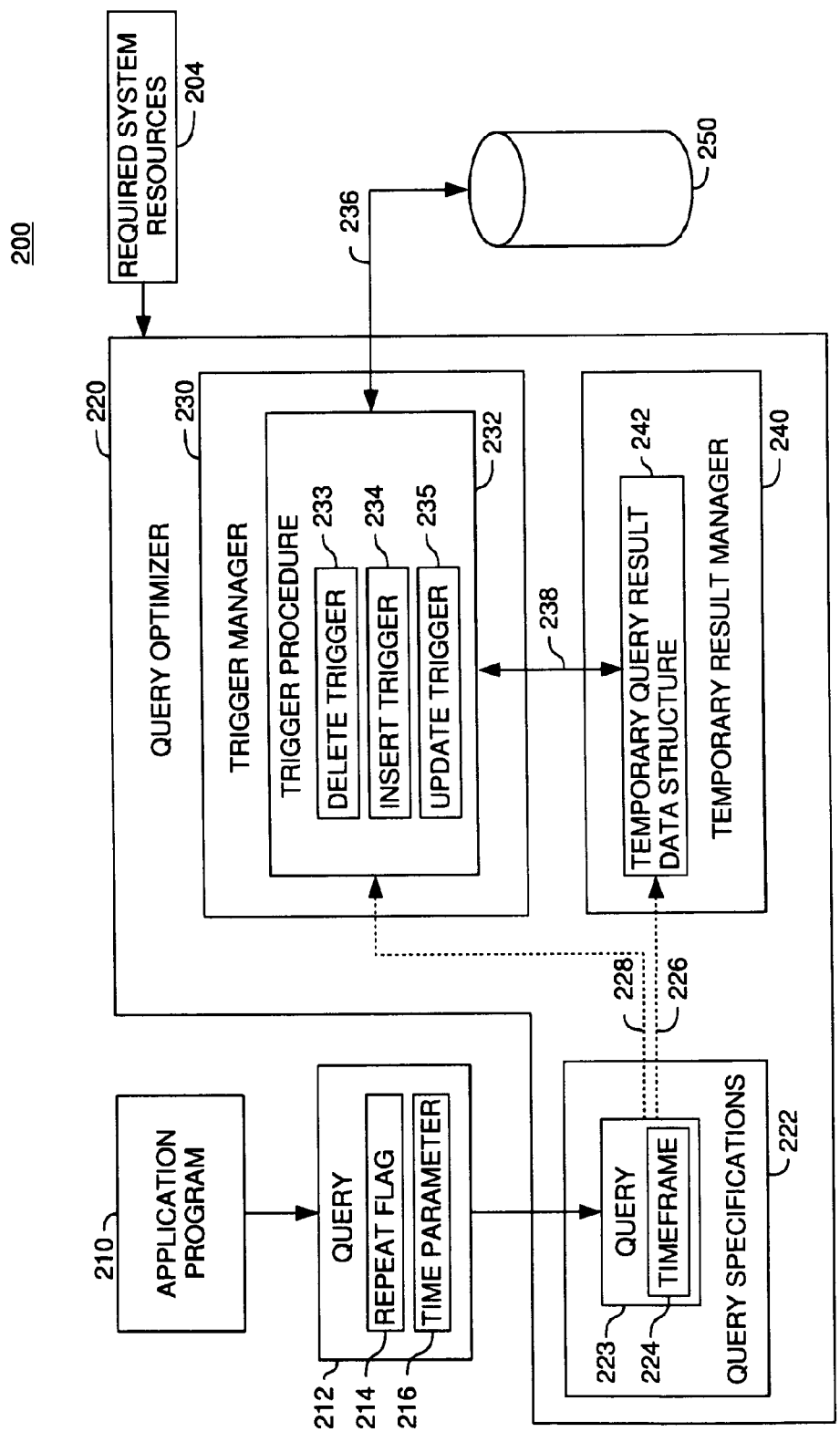
FIG. 2 is a relational view of components implementing the invention.

Referring now to FIG. 2, an illustrative relational view 200 of a query optimizer 220 (e.g., query optimizer 137 of FIG. 1) and other components of the invention is shown. Operation and interaction of the query optimizer 220 and the other components are described in more detail below with reference to FIGS. 3 to 7.

The query optimizer 220 receives a query 212 from an issuing entity, such as a user and/or an application 210 (e.g., application program 136 of FIG. 1), for execution against one or more databases 250 (e.g., database 160 of FIG. 1). According to one aspect of the invention, the received query 212 is an SQL query. For instance, assume an insurance company having an insurance claims data mining environment including a database with two different tables. A first table CLIENTS contains personal information related to clients of the insurance company. The CLIENTS table may include a plurality of rows and columns. Each row is associated with a particular client of the insurance company. Each column in a row provides different information about a corresponding client. For example, the columns client_id, client_name, client_age and client_data can be provided for each row of the CLIENTS table. The "client_id"-column contains identifiers for clients, each identifier uniquely identifying a corresponding client. The "client_name"-column contains the names of the clients and the "client_age"-column specifies the ages of the clients. The "client_data"-column contains more detailed information about the clients. A second table CLAIMS contains information about insurance claims. The CLAIMS table provides a row for each insurance claim. Each row includes a plurality of columns, such as claim_id, client_id, claim_type and claim_description. The "claim_id"-column contains claim identifiers for uniquely identifying each claim. The "client_id"-column contains values that correspond to values contained in the "client_id"-column of the CLIENTS table. This column serves to link insurance claims to corresponding clients of the insurance company. The "claim_type"-column specifies the type of a corresponding insurance, such as health care or automobile. The "claim_description"-column contains more detailed information about each insurance claim, e.g., a reason for deposition of the claim, such as a description of an accident.

Assume now that the insurance company detects an increase of claims for a specific type of insurance, e.g., an XYZ insurance. The insurance company decides consequently to perform a search on received claims related to the XYZ insurance, for instance during a time period of six months. By this search the names of all clients who submitted to the insurance company a claim for the XYZ insurance during the time period should be determined. In addition, only claims for clients over an age of 40 years are to be analyzed in more detail. A corresponding SQL query exemplifying the query 212 for this search is shown below in Table I:

TABLE I

EXEMPLARY SQL QUERY

001: Select client_name, claim_information
002: From CLIENTS, CLAIMS
003: where claim_type='XYZ' and client_age>40 and
004:    CLIENTS.client_id=CLAIMS.client_id Initially, the query illustrated in Table 1 is executed to determine all matching records from the CLIENTS and CLAIMS tables. Subsequently, the query will frequently be re-executed in order to determine whether the CLIENTS and CLAIMS tables have been updated. Thus, it may for instance be determined whether new claims for the XYZ insurance have been received by the insurance company or not.

To this end, the query optimizer 220 may analyze the query 212 to determine whether the query is re-executable. In one embodiment, it can be determined whether the query 212 is earmarked as re-executable. The query 212 can be earmarked as re-executable using any suitable mechanism. For instance, the query 212 can be labeled to indicate to the query optimizer 220 that the query 212 is re-executable. This can be accomplished in numerous ways, for instance, using the CHange QueRY Attributes (CHGQRYA) control language (CL) command available in IBM's DB2 Universal Database for iSeries. The CHGQRYA CL command is suitable for modifying different types of attributes of queries, such as the degree of parallelism or a maximum allowable execution time. The different attributes are defined in a query options file (QAQQINI). An exemplary attribute provided in the QAQQINI file is a QUERY_TIME_LIMIT attribute that is provided for setting the maximum allowable query execution time. Accordingly, an attribute as, for instance, RE-EXECUTABLE may be set in the QAQQINI file to indicate that the query 212 is re-executable. If the query 212 is re-executable, the query optimizer 220 optimizes re-execution of the query 212. In one embodiment, the query optimizer 220 creates triggers, such as SQL triggers, over the data being queried in the database(s) 250. The triggers are configured to keep up-to-date a temporary table such that the temporary table can immediately be pointed to for satisfying the query 212 for a first and any subsequent execution thereof.

More specifically, in the illustrated embodiment the query optimizer 220 includes query specifications 222, a trigger manager 230 and a temporary result manager 240 for query re-execution optimization. The query specifications 222 represent re-executable queries which are executed more than once against the database(s) 250. Illustratively, the query specifications 222 include a single re-executable query 223. Each re-executable query is associated with a temporary query result data structure, which is interchangeably referred to as the temporary data structure. Illustratively, the re-executable query 223 is associated with a temporary data structure 242, as indicated by dashed arrow 226. Each temporary data structure represents an up-to-date query result for an associated re-executable query. The temporary data structures can be managed by the temporary result manager 240. By way of example, the temporary result manager 240 manages a single temporary data structure 242. Each temporary data structure is continuously updated. Specifically, a temporary data structure is updated if changes to the database(s) 250 occur, which are relevant to the associated re-executable query. In the illustrated example, the temporary data structure 242 is updated if changes to the database(s) 250 occur, which are relevant to the associated re-executable query 223. To this end, the trigger manager 230 tracks changes to the database(s) 250. In one embodiment, the trigger manager 230 executes a trigger procedure for each re-executable query for tracking relevant changes to the database(s) 250. Illustratively, the trigger manager 230 executes a trigger procedure 232 for the re-executable query 223, as indicated by dashed arrow 228. In the illustrated example, the trigger procedure 232 tracks changes to the database(s) 250, as indicated with arrow 236. The trigger procedure 232 illustratively executes a delete trigger 233, an insert trigger 234 and an update trigger 235. The delete trigger 233 tracks delete operations, the insert trigger 234 tracks insert operations and the update trigger 235 tracks update operations performed on the database(s) 250. If the trigger procedure 232 determines relevant changes to the database(s) 250, the trigger procedure 232, or the trigger manager 230, updates the temporary data structure 242, as indicated by arrow 238

More specifically, in one embodiment the query optimizer 220 determines upon reception of the query 212, whether or not the query 212 is re-executable. If the received query 212 is re-executable, it is stored within the query specifications 222. Illustratively, the query 212 is determined as re-executable and stored as the re-executable query 223. Furthermore, according to one aspect of the invention the query optimizer 220 accounts for an estimated amount of system resources 204 required for execution of the query 212. If the estimated amount of required system resources 204 is below a predetermined threshold, it may be assumed that re-execution management for the query 212 would consume more system resources than a repeated execution thereof. Consequently, in this case the re-execution management can be cancelled. The threshold can, e.g., be user-specific, application-specific or system-specific. If the threshold is user-specific, it can be specified by the user when issuing the query. If the threshold is application-specific, it can be stored together with a corresponding application program (e.g., application program 136 of FIG. 1). If the threshold is system-specific, it can be specified by the operating system (e.g., operating system 135 of FIG. 1).

In one embodiment, the determination as to whether the query 212 is re-executable or not is performed on the basis of an indication provided by the issuing entity. Illustratively, the indication is shown as a repeat flag 214 provided with the query 212. By way of example, the issuing entity may mark the query 212 as re-executable by setting the repeat flag 214. In one embodiment, the repeat flag 214 can be set using a graphical user interface. For instance, if a user inputs a query using the graphical user interface, any suitable means such as a push-button or checkbox may be provided to enable the user to indicate that the query is re-executable.

However, it should be noted that setting the repeat flag 214 is merely one possibility of indicating that the query 212 is re-executable. Alternatively, the query optimizer 220 can automatically determine whether a query is re-executable or not independent from an indication in the query. Accordingly, the query optimizer 220 may store each received query, for instance within the query specifications 222. Thus, when a new query is received, the query optimizer 220 can determine whether a query corresponding to the newly received query is already stored or not. If such a query is already stored, the query optimizer 220 may assume that the query is re-executable and subsequently manage re-execution of the newly received query. Alternatively, logging information can be analyzed to determine whether the newly received query has previously been executed.

Furthermore, in one embodiment, the query 212 can be provided with a time parameter 216. The time parameter 216 can be used to determine a timeframe 224 during which the query 212, i.e., the re-executable query 223 is supposed to be repeatedly executed. The re-executable query 223 can be stored together with the determined timeframe 224 within the query specifications 222. Indication of a time parameter can, for instance, be useful in cases where a duration for a given search is predetermined.

Figure 3:
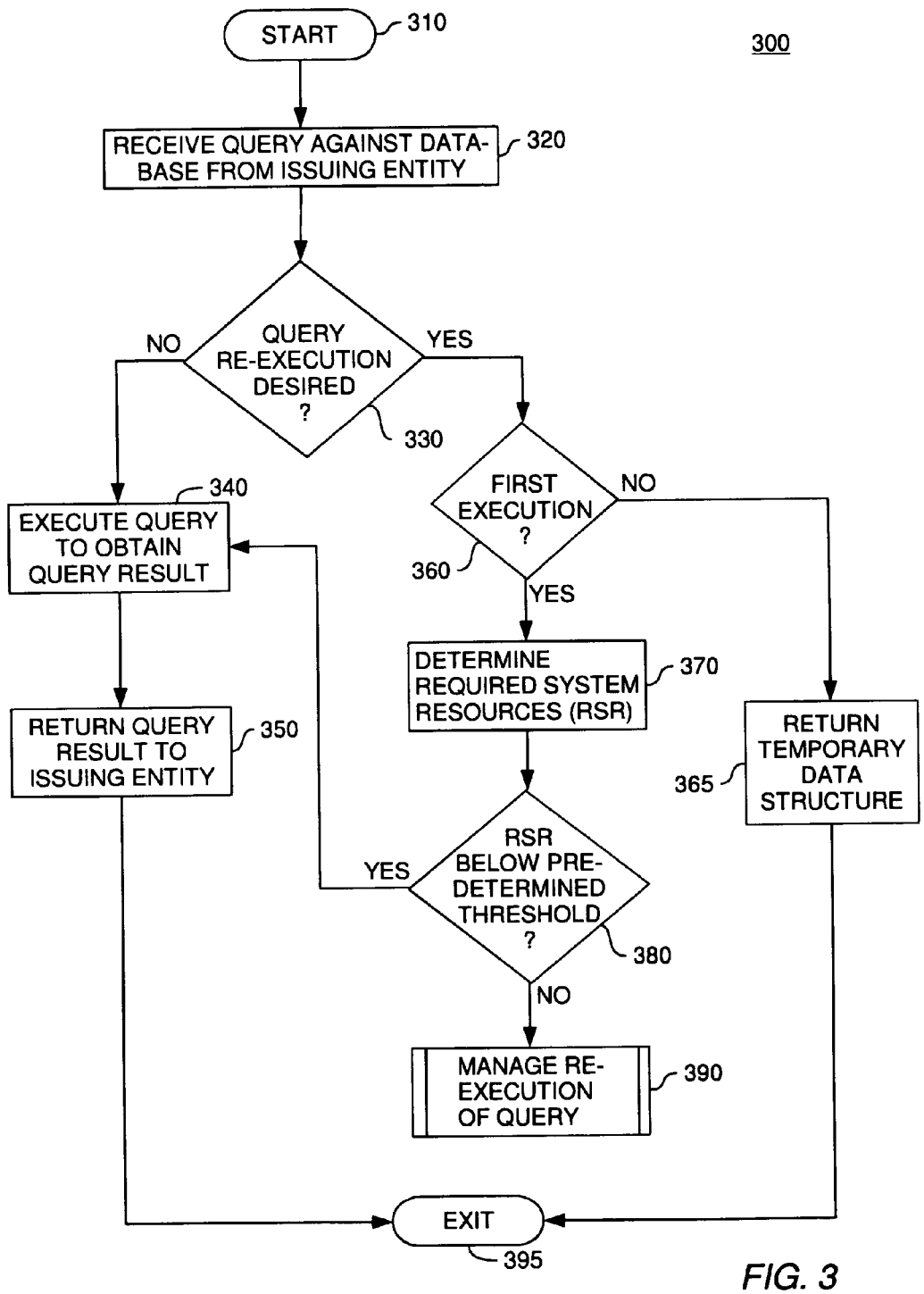
FIG. 3 is a flow chart illustrating query execution optimization in one embodiment.

Exemplary query execution and re-execution management processes performed by a query optimizer (e.g., query optimizer 137 of FIG. 1 or 220 of FIG. 2) in a data processing system (e.g., data processing system 102 of FIG. 1) are described below with reference to FIGS. 3 to 7. Referring now to FIG. 3 one embodiment of a method 300 for query execution optimization is illustrated. The method 300 starts with step 310. In step 320, a query (e.g., query 212 of FIG. 2) against one or more databases (e.g., database 250 of FIG. 2) is received from an issuing entity, such as a user or an application (e.g., application programs 136 of FIG. 1). In step 330, it is determined whether the query is re-executable or not. For instance, it may be determined in step 330 whether a repeat flag (e.g., repeat flag 214 of FIG. 2) of the query is set or not.

If it is determined in step 330 that the query is to the executed only once, the query is executed in step 340. Specifically, the query is executed against one or more databases specified by the query in order to obtain a query result. In step 350, the obtained query result is returned to the issuing entity. Executing a query and returning an obtained query result is well known in the art and will not be explained in more detail. The method 300 then exits at step 395.

If it is determined in step 330 that the query is re-executable, it is determined in step 360 whether the query is executed for the first time or whether the query has already been executed. In one embodiment, this determination is performed using logging information. Alternatively, this determination may be performed in comparing the query to stored re-executable queries (e.g., re-executable queries 223 in the query specifications 222). If the query has not been executed previously, no corresponding stored re-executable query can be retrieved. In this case, it can be determined whether a particular stored re-executable query exists that includes query conditions, which are all contained in the current query. It can be assumed that a temporary structure associated with this particular stored re-executable query can be used as a basis for execution of the query to shorten execution time. In other words, as the query includes at least all conditions of the particular stored re-executable query, the query result for the query will be a subset of the temporary structure associated with this particular stored re-executable query. If, however, the query has already been executed, a corresponding stored re-executable query can be retrieved. Thus, it may be assumed that a temporary data structure (e.g., temporary query result data structure 242) has already been created for the query. Consequently, the temporary data structure is maintained in storage (e.g., main memory 122) for the query as an up-to-date query result. Creating and maintaining the temporary data structure is explained in more detail below with reference to FIG. 6. In step 365 the temporary data structure can be returned as query result to the issuing entity. The method 300 then exits at step 395.

However, if it is determined in step 360 that the query has not been executed previously, an estimated amount of system resources required for processing the query (e.g., required system resources 204) is determined in step 370. In step 380, the determined estimated amount of system resources is compared with a predetermined threshold. If the determined estimated amount of system resources is below the predetermined threshold, processing continues at step 340 as described above. Otherwise, re-execution management for the query is initiated at step 390. An exemplary re-execution management method is described below with reference to FIGS. 4 to 7.

Figure 4:
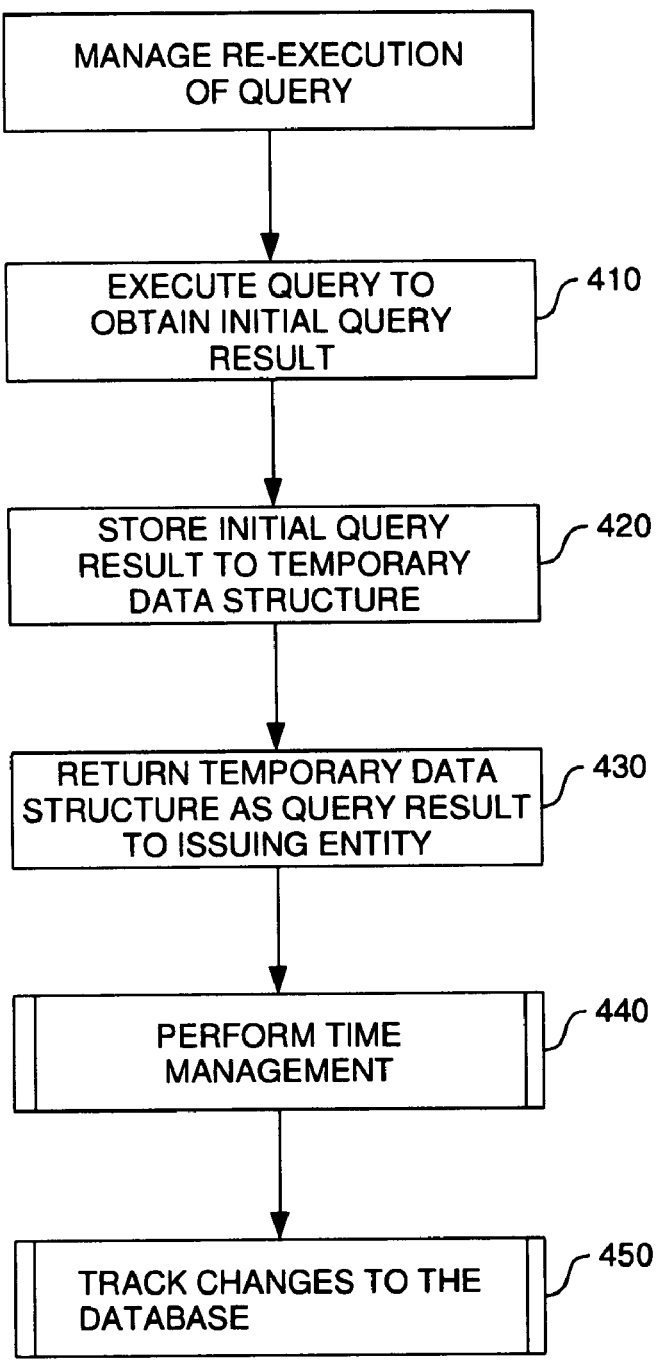
FIG. 4 is a flow chart illustrating query re-execution management in one embodiment.

Referring now to FIG. 4, one embodiment of a method 400 for managing re-execution of a query according to step 390 of FIG. 3 is illustrated. The method 400 starts at step 410, where the query is executed against the database(s) to obtain an initial query result. Functionally, step 410 corresponds to step 340 of FIG. 3. In step 420, the initial query result is stored as a temporary data structure (e.g., temporary query result data structure 242 of FIG. 2) associated with the query. Storing data in a temporary data structure is well known in the art and will, therefore, not be explained in more detail. In step 430, the temporary data structure is returned as query result to the issuing entity.

At step 440, a time management process for determining a re-execution duration for the query is performed. An exemplary time management process is explained below with reference to FIG. 5. At step 450, a process for tracking changes to the database(s) is performed. Tracking changes to the database(s) is described below with reference to FIG. 6.

Figure 5:
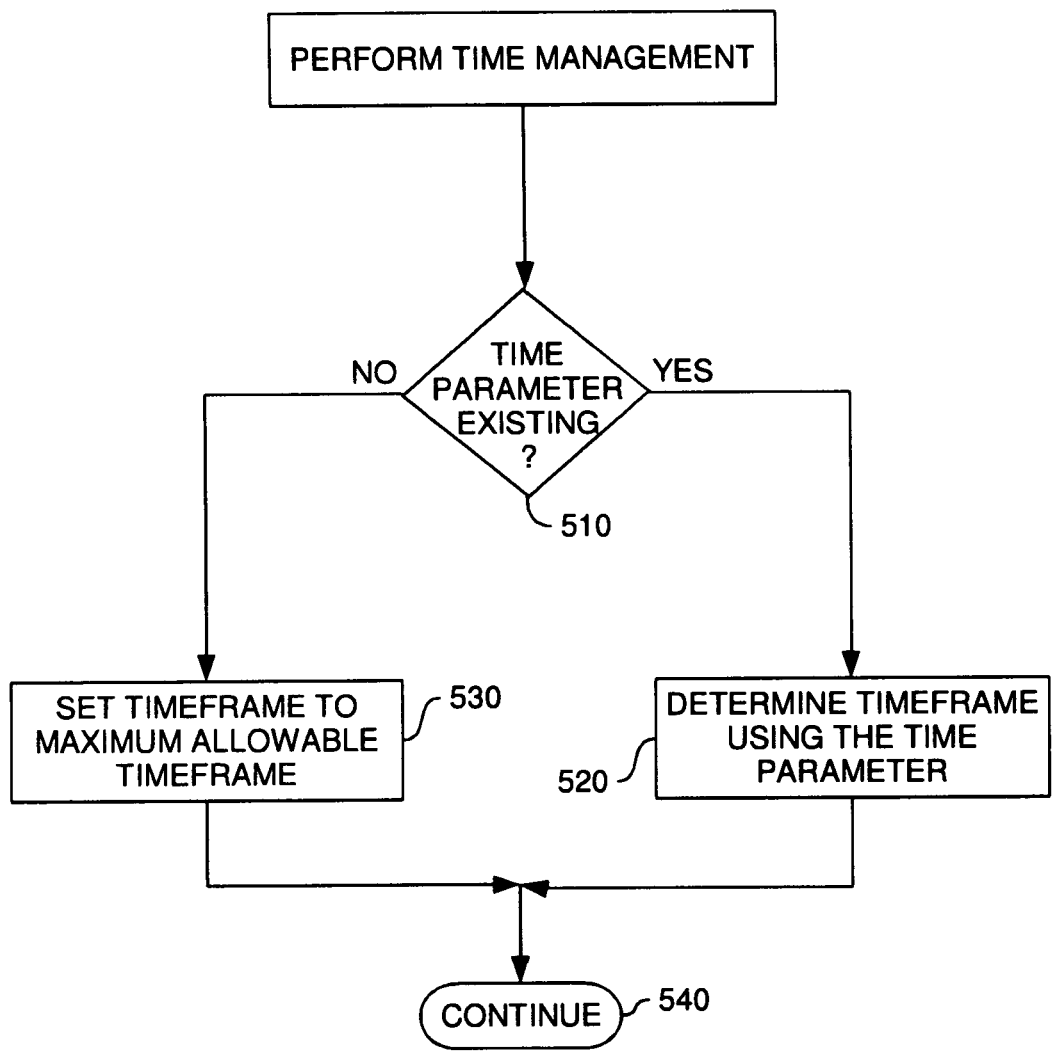
FIG. 5 is a flow chart illustrating an embodiment of time management.

Referring now to FIG. 5, one embodiment of a method 500 for performing time management according to step 440 of FIG. 4 is illustrated. The method 500 starts at step 510, where a determination is made as to whether a time parameter (e.g., time parameter 216 of FIG. 2) for the query exists or not. The time parameter can be query-specific, database-specific, issuing entity-specific or system-specific. Accordingly, the time parameter indicates, in one embodiment, a point of time when execution of the trigger procedure associated with the query is to be terminated. In another embodiment, the time parameter indicates a point of time when the temporary data structure associated with the query is to be deleted. In still another embodiment, the time parameter specifies a query expiration date, such as July, 30. In yet another embodiment, the time parameter specifies a duration, such as six months. The time parameter may, for instance, be specified using a query options file, such as the QAQQINI file described above.

If it is determined that a time parameter exists for the query, a corresponding timeframe (e.g., timeframe 224 of FIG. 4) is determined at step 520 using the time parameter. In one embodiment, the determined timeframe is stored together with the query (e.g., query 223 of FIG. 2). If, however, no time parameter exists, the timeframe can be set at step 530 to a maximum allowable timeframe. The maximum allowable timeframe may be user-specific or application-specific. Furthermore, the maximum allowable timeframe can be preset by an administrator of the database(s). Alternatively, if no time parameter exists re-execution management for the query can be aborted. Processing then continues at step 540, i.e., at step 450 of FIG. 4.

Figure 6:
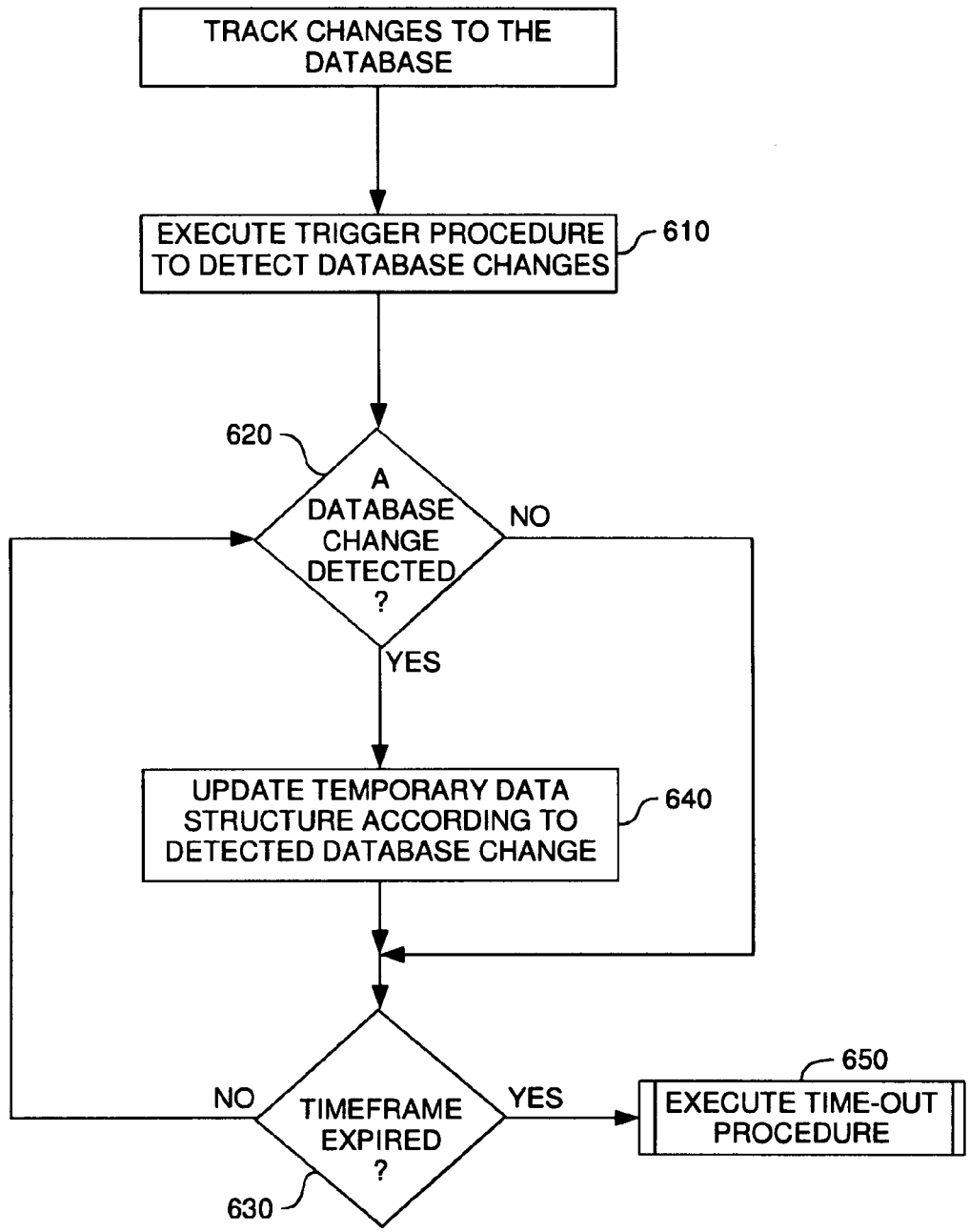
FIG. 6 is a flow chart illustrating tracking of database changes in one embodiment.

Referring now to FIG. 6, one embodiment of a method 600 for tracking changes to the database(s) according to step 450 of FIG. 4 is illustrated. The method 600 starts at step 610, where a trigger procedure (e.g., trigger procedure 232 of FIG. 2) is executed for the query to detect relevant changes to the database(s). Executing triggers or trigger procedures is well known in the art and will not be explained in more detail. Moreover, it should be noted that the present invention is not limited to execution of a trigger procedure.

Instead, any appropriate mechanism, known or unknown, for tracking changes to the database(s) is contemplated.

At step 620, a determination is made as to whether a database change has been detected. If a database change has been detected, which is relevant to the query, the temporary data structure associated with the query is updated in step 640. In one embodiment, the temporary data structure can be updated by re-executing the query against the database(s). Thus, the newly obtained query result can be used for overwriting and thereby updating the temporary data structure. Accordingly, as long as no database change is detected, the temporary data structure needs not to be updated and can always be returned as current query result upon receipt of the query, thereby allowing to reduce waiting time for the issuing entity. Alternatively, elements in the temporary data structure which correspond to the detected database change can be identified and updated. For instance, if a relevant record in the database(s) has been deleted, corresponding result elements in the temporary data structure can be identified and also deleted.

In one embodiment, the issuing entity can automatically be notified with respect to occurred relevant changes to the database(s). The notification may simply indicate that a database change was detected or contain information about the detected database change. Processing then continues at step 630. If no relevant database change has been detected, processing continues at step 630.

In step 630, a determination is made as to whether the timeframe (e.g., timeframe 224 of FIG. 2) associated with the query (e.g., query 223 of FIG. 2) has expired or not. If it is determined that the timeframe has not expired, tracking of changes to the database(s) continues. Accordingly, the method 600 returns to step 620. In other words, during the determined timeframe the method 600 performs a loop consisting of steps 620, 630 and 640. If, however, it is determined that the timeframe has already expired, a time-out procedure is executed at step 650, as explained below with reference to FIG. 7.

Figure 7:
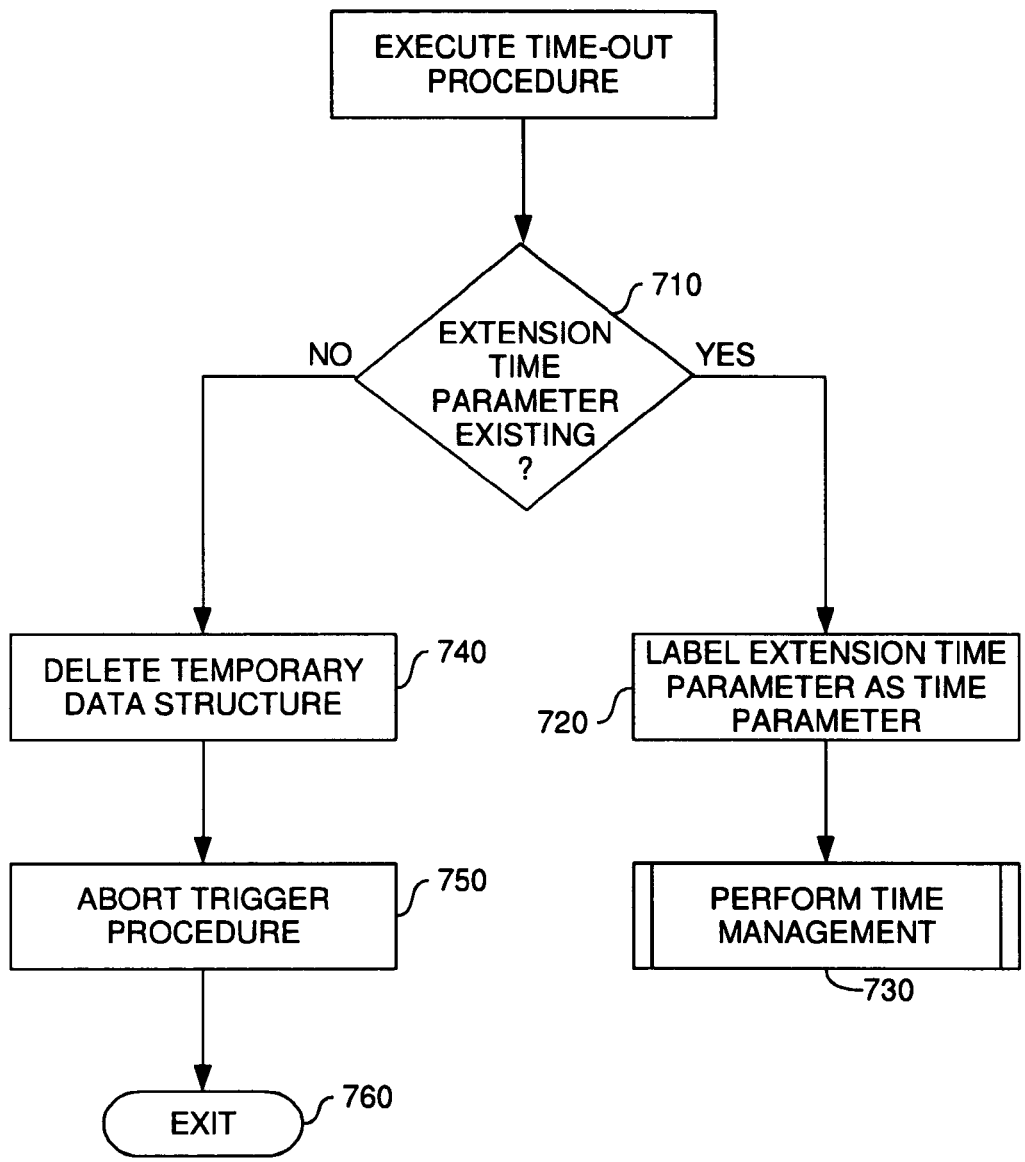
FIG. 7 is a flow chart illustrating execution of a time-out procedure in one embodiment.

Referring now to FIG. 7, one embodiment of a method 700 for performing a time-out procedure according to step 650 of FIG. 6 is illustrated. The method 700 starts at step 710, where a determination is made as to whether an extension time parameter for the query exists or not. The extension time parameter can be provided using any suitable means which are configured for associating the extension time parameter with the query. In one embodiment, a graphical user interface can display a list of selectable re-executable queries and allow for entering extension time parameters to be associated there with. If an extension time parameter exists for the query, the extension time parameter is labeled as time parameter (e.g., time parameter 216 of FIG. 2) at step 720. Thus, at step 730 a time management process for determining an extension re-execution duration for the query can be performed according to method 500 of FIG. 5. In this case, the tracking of changes to the database(s) according to FIG. 6 is not interrupted. In other words, step 610 of FIG. 6 is not re-executed and the loop formed of steps 620, 630 and 640 continues running.

If, however, no extension time parameter exists for the query, re-execution management for the query should be completed. Accordingly, in step 740 the temporary data structure maintained for the query (e.g., temporary query result data structure 242 of FIG. 4) is deleted. Thus, if the query is subsequently re-executed, a new initial query result must be determined according to the processing described above with reference to FIGS. 3 to 6. Furthermore, in step 750 the trigger procedure executed for the query is aborted. Method 700 then exits at step 760.

It should be noted that the order of sequence of the steps shown in FIGS. 3 to 7 is merely illustrative and is not intended to limit the invention thereto. Instead, different orders of sequence are possible. Moreover, the operations performed in at least several of the steps may be modified and/or different steps may be combined. For instance, steps 370 and 380 in FIG. 3 may be performed before the determination at step 330. Thus, if the determined estimated amount of system resources is below the predetermined threshold, step 330 of FIG. 3 can be omitted and processing may immediately continue at step 340. Furthermore, at step 360 in FIG. 3, instead of determining whether execution of the query is a first execution or whether the query has already been executed, it may be determined whether or not a temporary data structure is maintained in storage for the query. Steps 330 and 360 of FIG. 3, for example, may be combined. In this case, a query can be determined as re-executable independent on a repeat flag if the query has previously been executed. Moreover, steps 420 and 430 of FIG. 4 can be performed in an inverse order of sequence or even concurrently. Furthermore, the time management according to step 440 of FIG. 4 can be performed, for instance, before step 330 of FIG. 3. Thus, if no time parameter is specified with a query and therefore no timeframe can be determined, re-execution management for the query can be canceled. Moreover, for instance in FIG. 6 step 630 can be performed before step 640. Thus, when a database change is detected, updating of the temporary data structure can be omitted if the timeframe has already expired. Furthermore, step 610 of FIG. 6 can be performed concurrently with or immediately following to step 410 of FIG. 4. In FIG. 7 the sequence of steps 740 and 750 may be inverted.

It should be appreciated that the above described modifications to FIGS. 3 to 7 are merely intended to illustrate possible alternative embodiments of the invention. However, any method comprising steps or sequences of steps which lead to a suitable process for query execution optimization according to the invention is contemplated. For instance, triggers can be used for tracking only changes in databases that are infrequently updated. The first time a query is executed, an obtained initial query result is stored as a temporary data structure for a specified time period and triggers are added to the tables searched by the query. If any relevant table is modified during the specified time period, the temporary data structure is deleted. Thus, the query is only re-executed when changes to the tables occur. In other words, re-execution of a query can be avoided if it is known that the results only change infrequently, thereby avoiding the frustrating case where a user re-executes a query and waits a long time to get back a query result that he/she already has.

Moreover, besides the above described query execution optimization, an application of the above described principles and functionalities to every day online transactions is contemplated. For instance, an autonomic system may recognize when statements are executed repeatedly in a data processing system such that tracking changes to satisfy requests can be performed automatically. Furthermore, the tracking can be performed only when it is more efficient to do so.

While the foregoing is directed to embodiments of the present invention, other and further embodiments of the invention may be devised without departing from the basic scope thereof, and the scope thereof is determined by the claims that follow.

What is claimed is:

1. A method for optimizing execution of a query that is repeatedly issued from an issuing entity against a database, the method comprising:
   prior to executing the query against the database to obtain an initial query result:
   (i) determining an amount of system resources required for executing the query; and
   (ii) managing the re-execution of the query if the determined amount exceeds a predetermined threshold value;
   executing the query against the database to obtain the initial query result;
   returning the initial query result to the issuing entity; and
   managing re-execution of the query by:
   storing the initial query result in a temporary query result data structure;
   executing a trigger procedure for tracking database changes;
   when the trigger procedure detects a database change, updating the temporary query result data structure on the basis of the detected database change; and
   when the query is submitted for re-execution against the database, returning the temporary query result data structure to the issuing entity.

2. The method of claim 1, wherein managing the re-execution of the query is only performed if the query includes a flag indicating that the query is to be executed two or more times.

3. The method of claim 1, wherein the predetermined threshold value is one of user-specific, application-specific and system-specific.

4. The method of claim 1, further comprising:
   providing a notification to the issuing entity indicating the updating of the temporary query result data structure.

5. The method of claim 1, wherein the trigger procedure executes at least one of:
   a delete trigger for tracking delete operations performed on the database;
   an insert trigger for tracking insert operations performed on the database; and
   an update trigger for tracking update operations performed on the database.

6. The method of claim 1, wherein managing the re-execution of the query comprises:
   determining a timeframe from a predefined time parameter; and
   managing the re-execution in accordance with the determined timeframe.

7. The method of claim 6, wherein determining the timeframe comprises:
   extracting the predefined time parameter from the query.

8. The method of claim 6, wherein the predefined time parameter indicates a point of time when execution of the trigger procedure is to be terminated.

9. The method of claim 8, further comprising, after the determined timeframe is elapsed:
   deleting the temporary query result data structure; and
   if the query is re-executed against the database, executing the query against the database to obtain a new initial query result.

10. The method of claim 6, wherein the predefined time parameter indicates a point of time when the temporary query result data structure is to be deleted.

11. The method of claim 6, further comprising, after the determined timeframe is elapsed:
    determining, whether an extension time parameter can be identified; and
    if so, updating the timeframe on the basis of the identified extension time parameter.

12. The method of claim 6, wherein the predefined time parameter is one of a query-specific parameter, a database-specific parameter, an issuing entity-specific parameter and a system-specific parameter.

13. A method for optimizing system resources used to execute a query that is repeatedly issued from an issuing entity against a database, the method comprising:
    tracking changes to the database;
    if a database change is detected:
    retrieving a temporary query result data structure storing a query result obtained from a previous execution of the query;
    updating the temporary query result data structure on the basis of the detected database change; and
    if the query is submitted for re-execution against the database, returning the temporary query result data structure as a query result to the issuing entity; and
    prior to the tracking:
    determining an amount of system resources required to execute the query; and
    tracking the changes to the database only if the determined amount exceeds a predetermined threshold value.

14. The method of claim 13, further comprising:
    providing a notification to the issuing entity indicating the updating of the temporary query result data structure.

15. The method of claim 13, further comprising:
    receiving another query against the database;
    determining, whether the another query includes all query conditions defined by the query; and
    if so, determining another query result for the another query using the temporary query result data structure.

16. The method of claim 13, wherein the tracking is only performed if the query includes a flag indicating that the query is to be executed two or more times.

17. The method of claim 13, wherein the predetermined threshold value is one of user-specific, application-specific and system-specific.

18. The method of claim 13, wherein the tracking of the changes to the database is performed by a trigger procedure.

19. A computer readable medium containing a program which, when executed, performs a process for optimizing execution of a query that is repeatedly issued from an issuing entity against a database, the process comprising:
    prior to executing the query against the database to obtain an initial query result:
    determining an amount of system resources required for executing the query; and
    managing the re-execution of the query only if the determined amount exceeds a predetermined threshold value;
    executing the query against the database to obtain the initial query result;
    returning the initial query result to the issuing entity; and
    managing re-execution of the query by:
    storing the initial query result in a temporary query result data structure;
    executing a trigger procedure for tracking database changes;

when the trigger procedure detects a database change, updating the temporary query result data structure on the basis of the detected database change; and when the query is submitted for re-execution against the database, returning the temporary query result data structure to the issuing entity.

20. The computer readable medium of claim 19, wherein managing the re-execution of the query is only performed if the query includes a flag indicating that the query is to be executed two or more times.

21. The computer readable medium of claim 19, wherein the predetermined threshold value is one of user-specific, application-specific and system-specific.

22. The computer readable medium of claim 19, wherein the process further comprises:

sending a notification to the issuing entity indicating the updating of the temporary query result data structure.

23. The computer readable medium of claim 19, wherein the trigger procedure executes at least one of:

a delete trigger for tracking delete operations performed on the database;

an insert trigger for tracking insert operations performed on the database; and an update trigger for tracking update operations performed on the database.

24. The computer readable medium of claim 19, wherein managing the re-execution of the query comprises:

determining a timeframe from a predefined time parameter; and managing the re-execution in accordance with the determined timeframe.

25. The computer readable medium of claim 24, wherein determining the timeframe comprises:

extracting the predefined time parameter from the query.

26. The computer readable medium of claim 24, wherein the predefined time parameter indicates a point of time when execution of the trigger procedure is to be terminated.

27. The computer readable medium of claim 26, wherein the process further comprises, after the determined timeframe is elapsed:

deleting the temporary query result data structure; and if the query is re-executed against the database, executing the query against the database to obtain a new initial query result.

28. The computer readable medium of claim 24, wherein the predefined time parameter indicates a point of time when the temporary query result data structure is to be deleted.

29. The computer readable medium of claim 24, wherein the process further comprises, after the determined timeframe is elapsed:

determining, whether an extension time parameter can be identified; and if so, updating the timeframe on the basis of the identified extension time parameter.

30. The computer readable medium of claim 24, wherein the predefined time parameter is one of a query-specific parameter, a database-specific parameter, an issuing entity-specific parameter and a system-specific parameter.

31. A computer readable medium containing a program which, when executed, performs a process for optimizing system resources used to execute a query that is repeatedly issued from an issuing entity against a database, the process comprising:

tracking changes to the database;

if a database change is detected:

retrieving a temporary query result data structure storing a query result obtained from a previous execution of the query;

updating the temporary query result data structure on the basis of the detected database change; and if the query is submitted for re-execution against the database, returning the temporary query result data structure as a query result to the issuing entity; and prior to the tracking:

determining an amount of system resources required to execute the query; and tracking the changes to the database only if the determined amount exceeds a predetermined threshold value.

32. The computer readable medium of claim 31, wherein the process further comprises:

sending a notification to the issuing entity indicating the updating of the temporary query result data structure.

33. The computer readable medium of claim 31, wherein the process further comprises:

receiving another query against the database;

determining, whether the another query includes all query conditions defined by the query; and if so, determining another query result for the another query using the temporary query result data structure.

34. The computer readable medium of claim 31, wherein the tracking is only performed if the query includes a flag indicating that the query is to be executed two or more times.

35. The computer readable medium of claim 31, wherein the predetermined threshold value is one of user-specific, application-specific and system-specific.

36. The computer readable medium of claim 31, wherein the tracking of the changes to the database is performed by a trigger procedure.

37. A data processing system comprising:

a database; and a query optimizer residing in memory for optimizing execution of a query that is repeatedly issued from an issuing entity against the database, the query optimizer being configured for:

prior to executing the query against the database to obtain an initial query result:

determining an amount of system resources required for executing the query; and managing the re-execution of the query only if the determined amount exceeds a predetermined threshold value;

executing the query against the database to obtain the initial query result;

returning the initial query result to the issuing entity; and managing re-execution of the query by:

storing the initial query result in a temporary query result data structure;

executing a trigger procedure for tracking database changes;

when the trigger procedure detects a database change, updating the temporary query result data structure on the basis of the detected database change; and when the query is submitted for re-execution against the database, returning the temporary query result data structure to the issuing entity.

38. A data processing system comprising:

a database; and a query optimizer residing in memory for optimizing system resource use for execution of a query that is repeatedly issued from an issuing entity against the database, the query optimizer being configured for:

tracking changes to the database;

if a database change is detected:
- retrieving a temporary query result data structure storing a query result obtained from a previous execution of the query;
- updating the temporary query result data structure on the basis of the detected database change; and
- if the query is submitted for re-execution against the database, returning the temporary query result data structure as a query result to the issuing entity; and prior to the tracking:
- determining an amount of system resources required to execute the query; and
- tracking the changes to the database only if the determined amount exceeds a predetermined threshold value.

* * * * *